June 30, 1970 R. G. HUMPHREY 3,518,419
PROJECTION SYSTEM FOR CIRCULAR ARRAY OF LASER DIODES
Filed Dec. 28, 1967
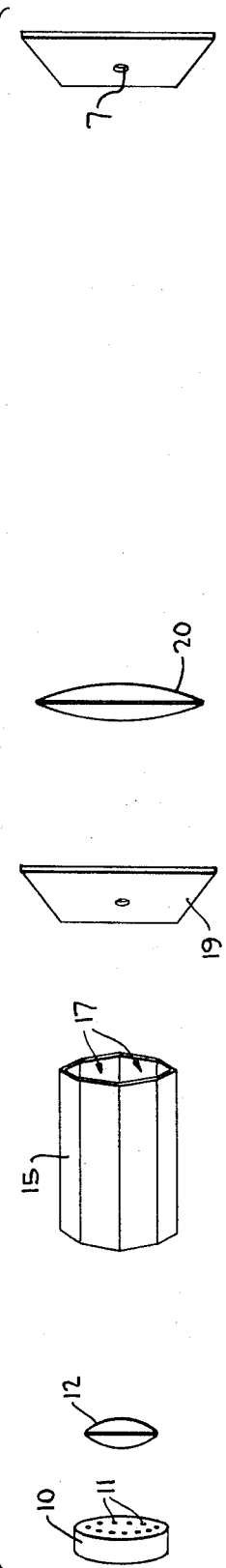
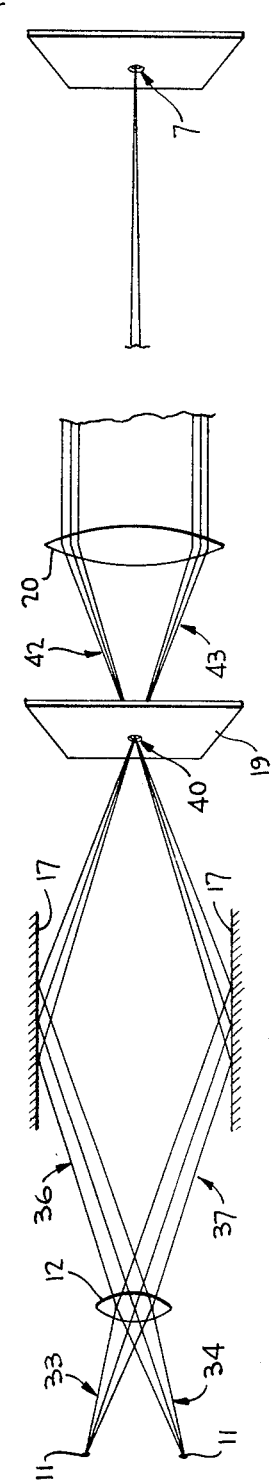
INVENTOR,
ROBERT G. HUMPHREY
BY Harry M. Saragovitz,
Edward J. Kelly, Herbert Berl
& J. D. Edgerton ATTORNEYS United States Patent Office 3,518,419
Patented June 30, 1970

3,518,419
PROJECTION SYSTEM FOR CIRCULAR ARRAY OF LASER DIODES
Robert G. Humphrey, Rockville, Md., assignor to the United States of America as represented by the Secretary of the Army
Filed Dec. 28, 1967, Ser. No. 694,197
Int. Cl. F21v 7/14, 13/04
U.S. Cl. 240—41.3         3 Claims

ABSTRACT OF THE DISCLOSURE

A projection system for a circular array of laser diodes which will combine the light radiated from the individual diodes into a single high intensity beam which is projected onto a target and which has a divergence on the order of that which can be obtained from a single laser diode system. The optics of the system are such that the radiation from each diode is reflected from a respective faceted reflective surface of a polyhedral mirror and the reflected beams are passed through a lensing system to form a concentrated beam with low divergence at the target.

---

The invention described herein may be manufactured, used, and licensed by or for the Government for governmental purposes without the payment to me of any royalty thereon.

BACKGROUND OF THE INVENTION

Recent development in the field of active range measuring systems have utilized the high intensity light output of laser diodes. Using a single gallium arsenide laser diode, an image of the active barrier is projected onto the target plane. For currently available diodes and optics of 4 or 5 centimeters diameter, beam divergence can be as small an one-half milliradian.

For many applications the power radiated by a single gallium arsenide laser diode is not sufficient. Increased power can be achieved by using an array of laser diodes. A circular array is a type with favorable properties. The diodes are mounted at symmetrical positions around a circular holding type of device. If the same method is used to project the diode array as with the single diode system, the image upon the target plane will consist of an array of spots. The total beam divergence will be larger than for the one diode case by the ratio of the array diameter to the active area diameter for a single diode. This ratio can be on the order of 50 or 100. A small improvement can be gained by using a field lens and a projection lens; however, a fast projection lens is then needed. For a F/1 projection lens the spot size may be reduced to about half of that for the directly projected array. For effective use of the arrayed laser diodes with modern range measuring systems it is necessary that the beam divergence be much smaller than this.

It is therefore an object of this invention to optically combine radiation from an array of laser diodes.

Another object of the invention is to provide a means of combining radiation from an array of laser diodes so as to project a beam onto a target plane which has a divergence on the order of that which can be obtained from a single diode system.

SUMMARY OF THE INVENTION

This projection system for a circular array of laser diodes provides a means of combining radiation from the diodes so as to project a beam with the divergence on the order of that which can be obtained from a single diode. The projection system uses a polyhedral mirror with one facet for each diode in the array. The optics of the system are such that the images of the active areas of the diodes are superimposed to form a concentrated beam of relatively small divergence at some target plane.

BRIEF DESCRIPTION OF THE DRAWING

FIG. 1 is a schematic representation of the elements of a projection system in accordance with my invention.

FIG. 2 is a ray diagram illustrating the operation of a projection system according to my invention.

DESCRIPTION OF THE PREFERRED EMBODIMENT

An arrangement of the components parts of my projection system is shown in FIG. 1. The gallium arsenide laser diodes are mounted in holding block 10, in a circular array with a diode 11 mounted at each of 11 of the 12 symmetrical positions. The 12th position is left unfilled and is used for lead connections to the power supply. Any number of diodes can of course be used in the array as long as the optics are adapted for the specific number.

A condenser lens 12 is placed in proximity to the diode array which will conduct light emitted from the array to a polyhedral mirror 15 having the same number of facets 17 as number of diodes in the array. The reflected beams form images on the field stop 19 in such a fashion that all the images are superimposed. The rays pass on through the field stop 19 and are projected by projection lens 20 to form a spot in the target plane 7 which is at a remote position.

Operation of my projection system can be better understood by referring to the ray diagram of FIG. 2. Two of the diodes 11 from opposite sides of the array are shown oriented so that the radiation patterns 33 and 34 are intercepted by condenser lens 12. The emerging beams 36 and 37 from condenser lens 12 are reflected by the respective facets 17 of the polyhedral mirror so as to form superimposed images at point 40. The field stop 19 may be placed at this point so as to cut down stray light, but otherwise it is not a necessary part of the projection system. The divergent beams 42 and 43 from point 40 pass beyond the field stop 19 and are intercepted by the projection lens 20. The combined image of the diode array is projected onto the target plan 7 at some point distant from the projection lens 20.

It will be apparent that the embodiments shown are only exemplary and that various modifications can be made in construction and arrangement within the scope of the invention as defined in the appended claims.

I claim as my invention:

1. A system for projecting light from a plurality of laser diodes onto a single concentrated spot comprising:
   (a) a plurality of laser diodes mounted on a planar surface having a central axis so as to project light beams only in a forward direction along said axis;
   (b) a polyhedral mirror having at least one facet for each of said laser diodes and located along said central axis;
   (c) a condensing means located along said central axis between said planar surface and said polyhedral mirror for collecting light beams from each of said laser diodes and directing each light beam onto a different facet of said polyhedral mirror; and
   (d) means for collecting the light beams reflected from each of said facets and projecting them onto a target as a single concentrated beam of light, said last-named means located along said central axis.

2. The system of claim 1 wherein said laser diodes are mounted in a circular array on said planar surface.

3. The system of claim 1 further comprising a field stop located on said central axis between said polyhedral mirror and said means for projecting light beams onto a target.

References Cited

UNITED STATES PATENTS 1,277,110  8/1918  Patterson _____ 240—41.3 XR
3,407,294  10/1968  Hill _____ 240—41.3 XR

FOREIGN PATENTS 6,703,218  10/1967  Netherlands.

NORTON ANSHER, Primary Examiner
R. P. GREINER, Assistant Examiner

U.S. Cl. X.R.
240—46.01